(12) United States Patent
Allen et al.

(10) Patent No.: US 11,558,468 B2
(45) Date of Patent: Jan. 17, 2023

(54) MOBILE CLIENT RECOVERY USING PUSH NOTIFICATIONS TO EXECUTE EXPONENTIAL BACK-OFF PROCEDURE

(71) Applicant: T-Mobile USA, Inc., Bellevue, WA (US)

(72) Inventors: Mark Daniel Allen, Renton, WA (US); Chakravarthi Japa, Bothell, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 158 days.

(21) Appl. No.: 17/088,337

(22) Filed: Nov. 3, 2020

(65) Prior Publication Data

US 2022/0141293 A1    May 5, 2022

(51) Int. Cl.
*H04L 67/141* (2022.01)
*H04L 9/40* (2022.01)
*H04L 41/0654* (2022.01)
*H04L 67/55* (2022.01)

(52) U.S. Cl.
CPC ........ *H04L 67/141* (2013.01); *H04L 41/0654* (2013.01); *H04L 63/08* (2013.01); *H04L 67/55* (2022.05)

(58) Field of Classification Search
CPC ... H04L 67/141; H04L 41/0654; H04L 63/08; H04L 67/55; H04W 12/37; H04W 12/06; H04W 12/61
See application file for complete search history.

(56) References Cited

U.S. PATENT DOCUMENTS

| | | | |
|---|---|---|---|
| 8,108,623 B2 | 1/2012 | Krishnaprasad et al. | |
| 8,788,881 B2 | 7/2014 | Salomon et al. | |
| 9,986,525 B1 | 5/2018 | Chiang et al. | |
| 2012/0173610 A1* | 7/2012 | Bleau | H04L 67/55 |
| | | | 709/203 |
| 2013/0151714 A1* | 6/2013 | Ralph | H04W 76/25 |
| | | | 709/227 |
| 2014/0359340 A1* | 12/2014 | Hua | H04L 65/1063 |
| | | | 714/4.11 |
| 2015/0120849 A1* | 4/2015 | Thies | H04L 67/55 |
| | | | 709/206 |

(Continued)

*Primary Examiner* — Michaela Keller
*Assistant Examiner* — Thao D Duong
(74) *Attorney, Agent, or Firm* — Summit Patents PC

(57) ABSTRACT

A system and method for recovering application authentication with an application server by using an exponential back-off procedure via push notifications is discussed herein. The system allows for authentication of a user account after network outages or service disruptions without traffic overload during recovery. A user equipment (UE) receives a failed registration notification after a failed registration attempt of the user account with an application server associated with the application. A push notification includes an instruction that causes the application to switch from an inactive state to a temporary active state. The push notification is sent from a push notification service in response to a push request from a notification server based on a recovery request from the UE due to the failed registration notification. While the application is in the temporary active state, the instruction further causes the application to request registration with the application server.

15 Claims, 4 Drawing Sheets

(56) References Cited

U.S. PATENT DOCUMENTS

| | | | |
|---|---|---|---|
| 2016/0072886 A1* | 3/2016 | Lin | H04L 67/01 |
| | | | 709/213 |
| 2016/0094683 A1* | 3/2016 | Yun | H04W 76/10 |
| | | | 709/203 |
| 2016/0234290 A1* | 8/2016 | Sharma | H04L 41/147 |
| 2016/0314057 A1* | 10/2016 | De Oliveira | G06F 11/3612 |
| 2017/0308446 A1* | 10/2017 | Kanso | H04L 67/1001 |
| 2017/0310827 A1 | 10/2017 | Mehta et al. | |
| 2019/0036985 A1* | 1/2019 | Ravichandran | H04L 65/1016 |
| 2019/0363886 A1* | 11/2019 | Atwood | H04L 63/0807 |
| 2019/0370376 A1* | 12/2019 | Demmon | G06F 11/2046 |
| 2022/0166811 A1* | 5/2022 | Pan | H04L 12/1831 |

* cited by examiner

MOBILE CLIENT RECOVERY USING PUSH NOTIFICATIONS TO EXECUTE EXPONENTIAL BACK-OFF PROCEDURE

BACKGROUND

Some mobile applications enable persistent login for a user account. Therefore, an application user does not need to re-authenticate the user account to use a service provided by the application. When application servers become inaccessible, such as due to a network outage or service disruption, the application has to recover access to the application server. The user account then needs to be re-authenticated.

Recovering authentication of the user account requires user interaction or user-initiated access requests. The application has to be activated by being brought to the foreground by the user. Once in the foreground, the application can send a registration request to the application server via a user equipment (UE) on which the application is installed. The registration request can be initiated by the application or by the user once the application becomes active. Before attempting re-registration, the user account can remain logged in or can logout and then login again. The re-authentication and re-registration processes are both time-consuming and frustrating to a user and decrease the quality of users' experience with the application and with their telecommunications network.

Furthermore, as more user accounts, applications, or both send registration requests, the network can become overloaded due an increase in volume of traffic. The increased volume of traffic can degrade network performance leading to slower network speeds, dropped services, or the like.

The state of the art would benefit from a system that more efficiently requests application server registration.

DETAILED DESCRIPTION

Figure 1:
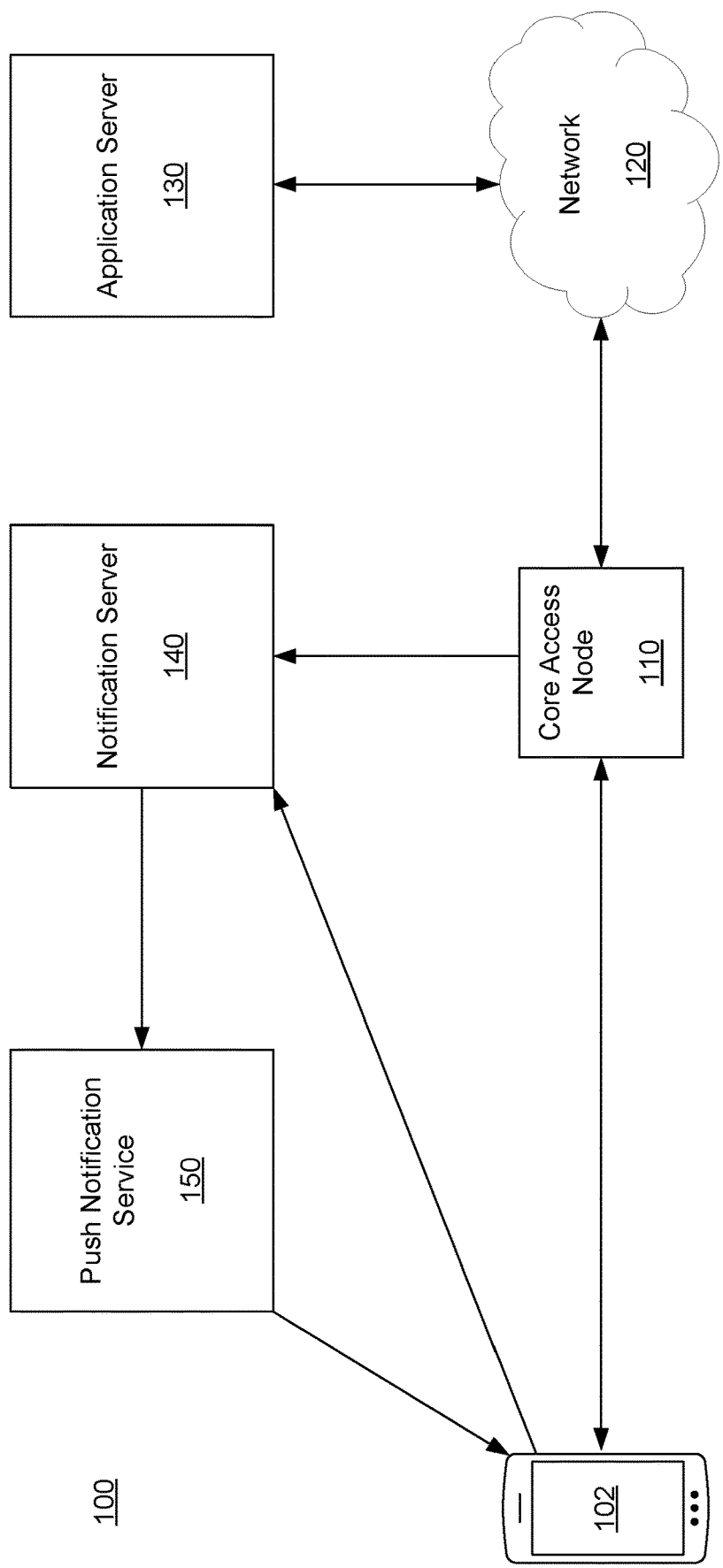
FIG. 1 illustrates an example system.

Systems and methods for recovering application authentication with an application server, such as by using an exponential back-off procedure via push notifications are discussed herein. The system allows for authentication of a user account after network outages or service disruptions without traffic overload during recovery. The system includes a core access node, a notification server, and a push notification service.

A user equipment (UE) (e.g., smartphone, tablet, or any mobile-connected or telecommunications-connected device capable of having an application installed thereon) can include an application that is not successfully registered with an application server due to a network outage or service disruption. When the application is not registered with the application server, the application can attempt to register with the application server until the registration is successful, until a maximum number of attempts is met or exceeded, or until a duration of time for which the application remains unregistered exceeds a time threshold. To register, a notification to attempt application registration can be requested from a telecommunications provider or a third party notification service. The notification can be requested by the application or by a node of a telecommunications network in communication with the UE.

The application, when not registered, remains in an inactive state due to a parameter restriction of the operating system of the UE (e.g., a power restriction to conserve power). The notification, being received by the UE from the telecommunications provider or the third party notification service, causes the application to switch from the inactive state to an active state. While the application is in the active state, the application to attempt to register with the application server. When the registration is successful, the application can remain active and further notifications are canceled since registration has been restored. When the registration is unsuccessful, the application switches back to the inactive state (i.e., due to the operating system's parameter restriction) and the process repeats until registration is successful, until the maximum number of attempts is met or exceeded, or until the time threshold is met or exceeded.

For example, the UE receives a failed registration notification after a failed registration attempt of the user account with an application server associated with the application. The application can fail to register with the application server due to inaccessibility, such as by a network outage or service disruption. The application or the UE generates a recovery request to the notification server in response to the failed registration notification. The UE transmits the recovery request to the notification server. The notification server transmits a push request to the push notification service in response to the recovery request. The push notification service transmits a push notification to the UE in response to the push request.

The push notification includes an instruction that causes the application to switch from an inactive state to a temporary active state. While the application is in the temporary active state, the instruction further causes the application or UE to request registration of the user account with the application server. The application returns to the inactive state after the UE transmits the recovery request to the application server or after the UE receives a notification from the core access node about failure or success of the recovery request. This process occurs without requiring any interaction or input from the user of the UE.

In one embodiment, the recovery request includes a time interval. The notification server sets a timer having the time interval. When the time interval expires, the notification server transmits a push request to the push notification service. In response to the push request, the push notification service generates and transmits a push notification to the UE. The push notification includes the instructions to switch states (i.e., inactive to temporary active) and to retry registration with the application server. This process continues until the application successfully registers with the application server or until the time interval exceeds a minimum time threshold. Each successive recovery request includes a time interval greater than the time interval of the preceding recovery request (i.e., exponential back-off). When the registration is successful, the application or UE stops generating recovery requests.

In another embodiment, the recovery request does not include a time interval. The notification server sets a timer having an internal time interval upon receipt of an initial recovery request. When the time interval expires, the notification server transmits a push request to the push notification service. In response to the push request, the push notification service generates and transmits a push notification to the UE. The push notification includes the instructions to switch states (i.e., inactive to temporary active) and to retry registration with the application server. Upon sending the push request, the notification server sets another timer having a time interval greater than the time interval of the preceding recovery request. Each successive recovery request includes a time interval greater than the time interval of the preceding recovery request (i.e., exponential back-off). This process continues until the application successfully registers with the application server or until the time interval exceeds a minimum time threshold. When the registration is successful, the notification server stops generating recovery requests.

The time interval between successive push notifications can increase multiplicatively or exponentially in a process called exponential back-off Increases in the time intervals can be doubled (e.g., 30 seconds to 60 seconds to 120 seconds, etc.), tripled, or the like. When the time interval exceeds a minimum time interval or threshold, as configured and set by the user or a third party, the UE logs out or receives instructions to logout. Therefore, the user is required to login again and re-authenticate when using the application the next time. The minimum time threshold is configurable and can be set to minutes, hours, or days.

FIG. 1 shows a system 100 for authentication recovery using push notifications to execute exponential back-off. The system 100 includes a user equipment (UE) 102 (e.g., smartphone, tablet, or any mobile-connected or telecommunications-connected device capable of having an application installed thereon), which includes an application having been previously installed thereon. The application can be downloaded and installed from an application store (e.g., Apple App Store, Google Play Store, or the like) or can be pre-installed (i.e., application is already installed on the UE when obtained, purchased, or shipped from an original equipment manufacturer).

The system 100 also includes a core access node 110. The core access node 110 validates and forwards requests or notifications from the UE 102 to another node, another component, or an external network. The core access node 110 also processes and forwards responses or notifications from another node, another component, or the external network to the UE 102. The core access node 110 can be a proxy-call session control function (P-CSCF) or, more generally, a call session control function (CSCF). The UE 102 can communicate with the core access node 110 via hypertext transfer protocol (HTTP).

The core access node 110 can also communicate with an application server 130 via a network 120, such as by HTTP, session initiation protocol (SIP), or both. The application server 130 is a server that installs, operates, and hosts applications and services associated with applications.

The network 120 can be wireless, wired, or combinations thereof. In one example, the network 120 can be an external network, including a local area network, a wide area network, or the like. In another example, the network 120 can be an IMS core of a telecommunications network. The IMS core is an architectural framework for delivering IP multimedia services. The IMS also handles session management and media control. The IMS core can include the application server 120 (i.e., to provide IMS services, including multi-party gaming, videoconferencing, messaging, community services, presence, and content sharing, and the like) or can communicate with the application server 120 via an external network.

The system 100 also includes a notification server 140. The notification server 140 is a server that sends a push request to a push notification service 150. In one example, the push request can be generated and transmitted in response to a request reminder stored within the notification server 140. The request reminder can be generated and stored by the notification server 140 in response to a message received from another device or component requesting information be sent to the UE 102 via a push notification based on an occurrence of a pre-determined condition or event. In another example, the push request can be generated and transmitted in response to a message (e.g., recovery request) received from another device or component requesting information be sent to the UE 102.

The system 100 also includes a push notification service 150. The push notification service 150 sends a push notification to the UE 102 based on the push request from the notification server 140. The push notification includes a payload to be transmitted to the UE 102. The payload is the data or information that is the intended message of the push notification. The push notification can also include a header to identify both the source and the destination of the push notification. The push notification can further include metadata which is data that can describe or help to understand other data.

The payload can include instructions that cause the application to switch from an inactive state to a temporary active state. The instructions can also cause the application to generate a recovery request while the application is in the temporary active state. The instructions can further cause the UE 102 to transmit the recovery request to the application server. The application can return to the inactive state after the UE transmits the recovery request to the application server or after the UE receives a notification from the core access node 110 about failure or success of the recovery request, whether by the instructions, non-use, a setting, or the like.

The push notification can also include a header. The header includes information associated with the device to receive the push notification (e.g., UE ID), the application to receive the push notification, the type of push notification service, and the like. The information can be included as a token or a notification channel, which identifies the device, the application, or both.

The information included in the header can be generated by the application or UE 102 and included in the recovery request. The payload or a portion of the payload can be generated by the UE 102, the notification server 140, the push notification service 150, or combinations thereof. In one example, the payload can be generated by the UE 102 and included in the recovery request to the notification server 140. The payload is then further included in the push request and the push notification to the application via the UE 102. In another example, the payload can be generated by the notification server in response to the recovery request and included in the push request to the push notification service. The payload is then further included in the push notification to the application via the UE 102. In yet another example, the payload can be generated by the push notification service and included in the push notification to the application via the UE 102.

The notification server 140 can communicate the UE 102, the core access node 110, and the push notification service 150 via HTTP, HTTP/2, hypertext transfer protocol secure (HTTPS), the like, or combinations or multiples thereof.

The push notification service 150 is a service that enables application developers to send notification data to applications installed on the UE 102. The notification information sent can include messages, badges, sounds, newsstand updates, custom text alerts, the like, or combinations or multiples thereof. Each platform or operating system has its own push notification service.

Figure 2:
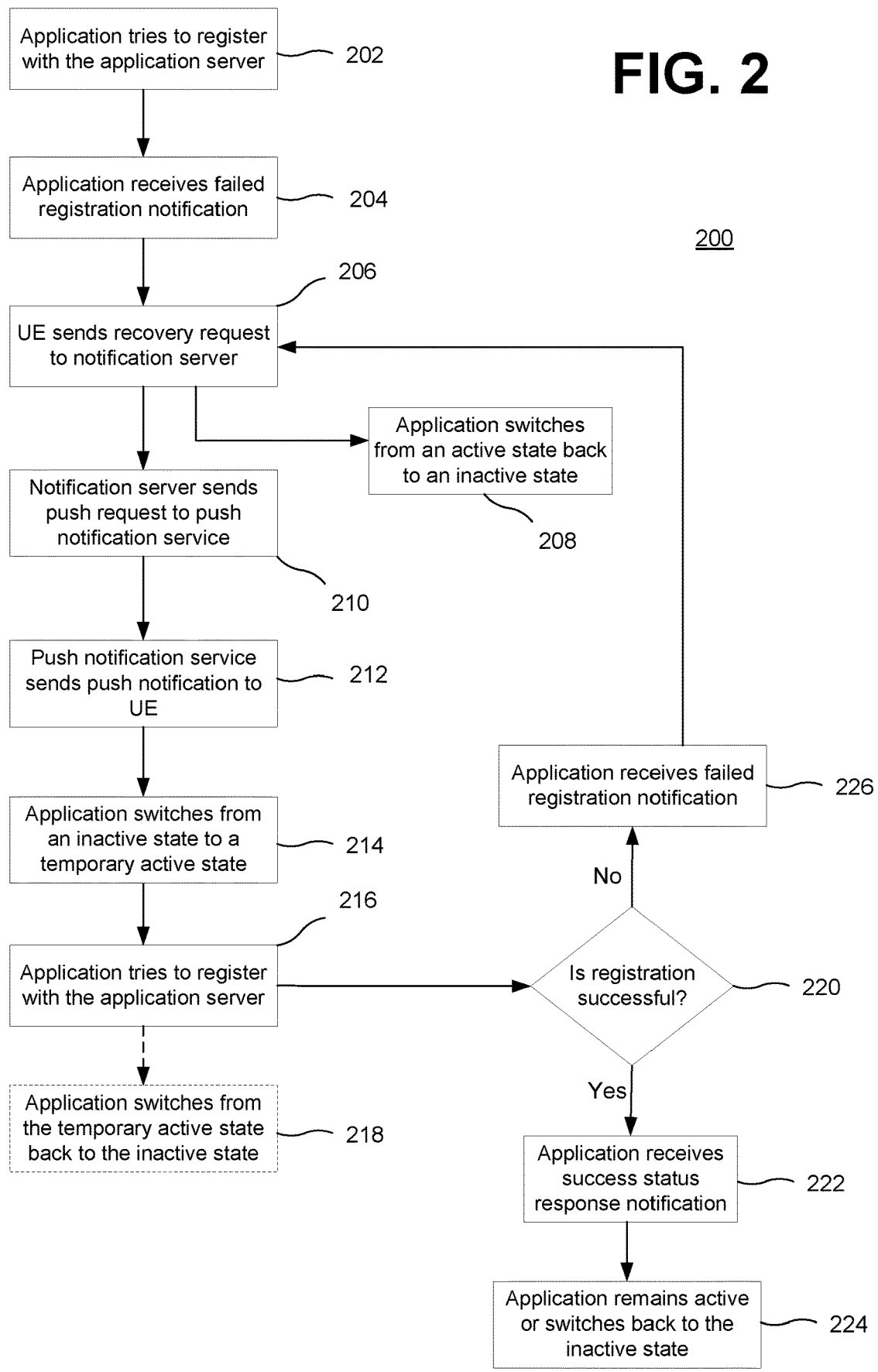
FIG. 2 illustrates a flowchart for an example process for recovering registration of an application with an application server.

FIG. 2 shows a method 200 for recovering registration of an application with an application server. At 202, the application tries to register with the application server. The application generates a registration request to verify the user of the application with the application server. The UE transmits the registration request via an output (e.g., a wireless module to transmit data via a cellular connection or a WiFi connection) to the core access node.

The core access node then tries to transmit the registration request to the application server. However, the requested registration is unsuccessful due to a network outage, a service disruption, or the like. At 204, the application receives a failed registration notification from the core access node indicating that the application is currently unable to register with the application server (e.g., "Error Response (HTTP 4xx/5xx)").

At 206, the UE sends a recovery request to the notification server in response to the failed registration notification. The recovery request includes the header. The recovery request can also include the payload. At 208, the application switches from an active state, whether temporary or otherwise, to an inactive state. The application can switch from the active state to the inactive state before, concurrently with, or after the UE sends the recovery request. The application switches from the active state to the inactive state due to a parameter restriction of the operating system of the device (e.g., a power restriction). The operating system places applications that are not in use or which are not registered or authenticated with the application server (i.e., the applications are in the background) into the inactive state or into standby to conserve power.

At 210, the notification server sends the push request to the push notification server in response to the recovery request. The push request includes the header and can include the payload. At 212, the push notification service sends a push notification to the application via the UE in response to the push request. The push notification includes the header and the payload.

At 214, the application switches from the inactive state to a temporary active state. The application can switch from the inactive state to the temporary active state based on an instruction included in the payload of the push notification. Or, the application can switch from the inactive state to the temporary active state based on an instruction by a processor of the UE in response to the push notification (i.e., the processor can be pre-programmed to instruct the application to become active upon receipt of a push notification). While in the temporary active state, at 216, the application tries to register with the application server again. Optionally, at 218, the application can switch back to the inactive state from the temporary active state after the application tries to register with the application server, regardless of whether the registration was successful or unsuccessful.

In one example, the instructions of the payload can also cause the application to generate a registration request while the application is in the temporary active state. The instructions can further cause the UE to transmit the registration request to the application server. The application can return to the inactive state after the UE transmits the registration request to the application server or after the UE receives a notification from the core access node about failure or success of the registration request, whether by the instructions, non-use, a setting, or the like.

In another example, the application can generate the registration request in response to the switch from the inactive state to the temporary active state.

At 220, it is determined whether or not the registration was successful. If the registration is successful, at 222, the application receives a success status response notification (e.g., "200 OK") from the application server via the core access node. At 224, the application can then remain active or switch back to the inactive state.

However, if the registration is unsuccessful, at 226, the application receives a second failed registration notification (e.g., "Error Response (HTTP 4xx/5xx)") from the core access node. Then, returning to 206, the UE sends a recovery request to the notification server in response to the failed registration notification.

Steps 206-216, 220, and 226 can repeat until the application successfully registers with the application server, until a maximum number of failed attempts is reached or exceeded, or until a minimum time threshold is met or exceeded.

Figure 3:
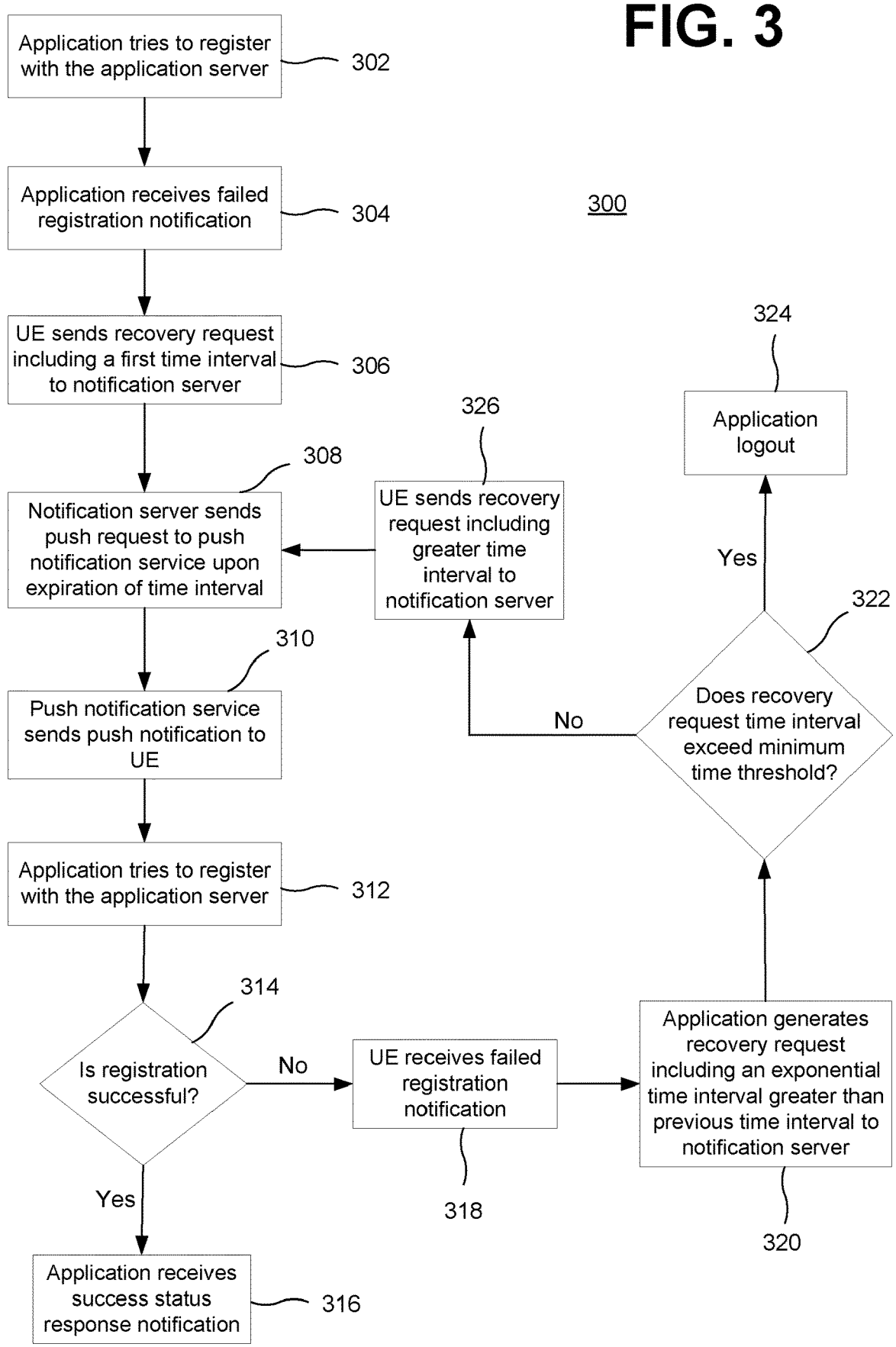
FIG. 3 illustrates a flowchart for an example process for recovering registration of an application with an application server.

FIG. 3 shows a method 300 for recovering registration of an application with an application server. At 302, the application tries to register with the application server. The application generates a registration request to verify the user of the application with the application server. The UE transmits the registration request via an output (e.g., a wireless module to transmit data via a cellular connection or a WiFi connection) to the core access node.

The core access node then tries to transmit the registration request to the application server. However, the requested registration is unsuccessful due to a network outage, a service disruption, or the like. At 304, the application receives a failed registration notification from the core access node indicating that the application is currently unable to register with the application server (e.g., "Error Response (HTTP 4xx/5xx)").

At 306, the UE sends a recovery request to the notification server in response to the failed registration notification. The recovery request includes the header and a first time interval. The recovery request can also include the payload. The first time interval is a duration of time from when the recovery request is received or processed by the notification server to when the notification server sends a push request to the push notification service.

The notification server creates a timer, which begins to count up to or count down from the first time interval upon receipt or processing of the recovery request. At 308, the notification server sends the push request to the push notification server upon expiration of the time interval. The push request includes the header and can include the payload. At 310, the push notification service sends a push notification to the application via the UE in response to the push request. The push notification includes the header and the payload.

The payload can be generated by the application, the UE, the core access node, the notification server, the push notification service, or combinations thereof based on a configuration of the system, node, component, or device or in response to a message, request, or notification received from another node, component, or device. The payload can be included with the recovery request, the push request, the push notification, or combinations thereof based on a service, system, node, component, or device configuration. The payload can be integrated into an outgoing message or request by the service, system, node, component, or device when the payload is included in an incoming message or request from another service, system, node, component, or device.

The payload, which is the message or data of interest, is read or processed by the UE, the application, or both to cause the application to switch from an inactive state to a temporary active state. Switching from the inactive state to the temporary active state permits the application to circumvent the parameter restrictions of the operating system in order to request registration with the application server (i.e., the application can exploit its functionalities and request registration while in the temporary active state, whereas the operating system inhibits the application from requesting registration when in the inactive state). While in the temporary active state, at 312, the application tries to register with the application server again.

In one example, the instructions of the payload can also cause the application to generate a registration request while the application is in the temporary active state. The instructions can further cause the UE to transmit the registration request to the application server. The application can return to the inactive state after the UE transmits the registration request to the application server or after the UE receives a notification from the core access node about failure or success of the registration request, whether by the instructions, non-use, a setting, or the like.

In another example, the application can generate the registration request in response to the switch from the inactive state to the temporary active state.

At 314, it is determined whether or not the registration was successful. Registration is successful when the network outage or service disruption has been resolved, thereby allowing the application to communicate with the application server. The services can therefore be accessed by or made available to the application. Registration is unsuccessful when the network outage or service disruption remains unresolved, thereby inhibiting the application from communicating with the application server. As discussed further, a "200 OK" response received from the application server denotes a successful registration, whereas an "Error Response (HTTP 4xx/5xx)" response received from the application server denotes an unsuccessful registration.

If the registration is successful, at 316, the application receives a success status response notification (e.g., "200 OK") from the application server via the core access node.

However, if the registration is unsuccessful, at 318, the application receives a second failed registration notification (e.g., "Error Response (HTTP 4xx/5xx)") from the core access node. At 320, the application generates a second recovery request to the notification server in response to the second failed registration notification. The second recovery request includes the header and a second time interval. The second recovery request can also include the payload. The second time interval is greater than the first time interval. The second time interval is determined using exponential back-off in which the time interval is multiplicatively or exponentially increased (i.e., time interval for successive recovery requests is doubled, tripled, or the like).

At 322, the UE determines whether or not the time interval exceeds a minimum time threshold. If the time interval exceeds the minimum time threshold, at 324, the UE does not send the second recovery request and the application is instructed to logout of the user account.

If the time interval does not exceed the minimum time threshold, at 326, the UE sends the second recovery request to the notification server. Then, returning to 308, the notification server sends a second push request to the push notification service upon expiration of the second time interval. Steps 308-314, 318-322, and 326 repeat until either the time interval of the recovery request exceeds the minimum time threshold, until a maximum number of registration attempts is met or exceeded, or until the application successfully registers with the application server. With each repetition, a successive time interval is greater than the time interval immediately preceding the successive time interval. The successive time interval is determined using exponential back-off in which the time interval immediately preceding it is multiplicatively or exponentially increased (i.e., time interval for successive recovery requests is doubled, tripled, or the like). For example, a first time interval is 30 seconds, a second time interval is 60 seconds, a third time interval is 120 seconds, a fourth time interval is 240 seconds, and so on. The maximum time threshold can be minutes, hours, or days.

Figure 4:
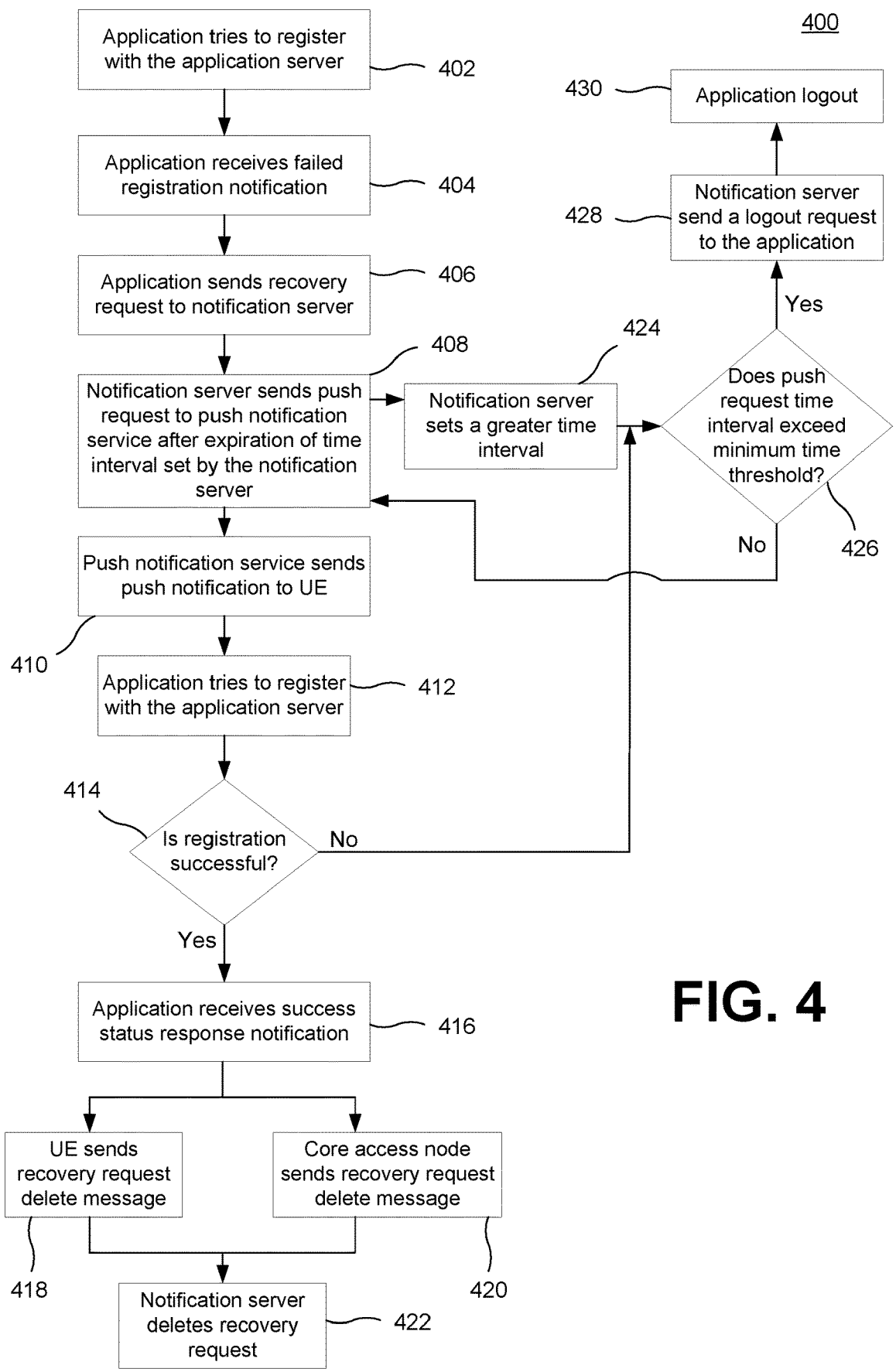
FIG. 4 illustrates a flowchart for an example process for recovering registration of an application with an application server.

FIG. 4 shows a method 400 for recovering registration of an application with an application server. At 402, the application tries to register with the application server. The application generates a registration request to verify the user of the application with the application server. The UE transmits the registration request via an output (e.g., a wireless module to transmit data via a cellular connection or WiFi connection) to the core access node.

The core access node then tries to transmit the registration request to the application server. However, the requested registration is unsuccessful due to a network outage, a service disruption, or the like. At 404, the application receives a failed registration notification from the core access node indicating that the application is currently unable to register with the application server (e.g., "Error Response (HTTP 4xx/5xx)").

At 406, the application sends a recovery request to the notification server via the UE in response to the failed registration notification. The recovery request includes the header. The recovery request can include the payload.

Upon receiving the recovery request, the notification server creates a recovery request reminder. The recovery request reminder sets an internal reminder to generate and send a push request to the push notification service. The recovery request reminder creates a timer having a first time interval. The recovery request reminder also stores the first time interval. At 408, the notification server sends the push request to the push notification server upon expiration of the time interval. At 410, the push notification service sends a push notification to the application via the UE in response to the push request.

After the notification server sends the push request to the push notification service, at 424, the notification services creates a timer having a greater time interval than preceding time interval. The timer begins to count up or count down from the greater time interval. The greater time interval is determined using exponential back-off in which the time interval is multiplicatively or exponentially increased (i.e., time interval for successive recovery requests is doubled, tripled, or the like). At 426, the notification server determines whether the time interval exceeds a minimum time threshold. If the time interval exceeds the minimum time threshold, at 428, the notification server cancels the recovery request reminder and sends a logout request to the application via the UE. To send the logout request, the notification server generates the logout request and sends the logout request to the application via the UE. At 430, the application logs out of the user account in response to the logout request.

Alternatively, the notification server generates the logout request, includes that instruction in a payload of a push request, and transmits the push request to the push notification service. The push notification service then includes the instructions in the payload of a push notification to the application via the UE, thereby causing the application to log out.

If the greater time interval does not exceed the minimum time threshold and the registration is not successful, at 408, the notification server sends a push request to the push notification server upon expiration of the greater time interval. Then, at 410, in response to the push request, the push notification service sends a push notification to the application via the UE.

At 412, the application tries to register with the application server again. At 414, it is determined whether or not the registration was successful. If the registration is successful, at 416, the application receives a success status response notification (e.g., "200 OK"). Then, at 418, the application sends a recovery request delete message to the notification server via the UE. Or, at 420, the core access node sends the recovery request delete message to the notification server. At 422, the notification server deletes a recovery request reminder and ceases to send push requests to the push notification service.

However, if the registration is unsuccessful, the application receives a second failed registration notification (e.g., "Error Response (HTTP 4xx/5xx)"). Because the registration is unsuccessful and the notification server has not received the recovery request delete message, at 408, the notification sends a push request to the push notification service upon expiration of the greater time interval.

Steps 408-414 and 424-426 repeat until either the time interval of the recovery request exceeds the minimum time threshold or until the application successfully registers with the application server. With each repetition, a successive time interval is greater than the time interval immediately preceding the successive time interval. The successive time interval is determined using exponential back-off in which the time interval immediately preceding it is multiplicatively or exponentially increased (i.e., time interval for successive recovery requests is doubled, tripled, or the like). For example, a first time interval is 30 seconds, a second time interval is 60 seconds, a third time interval is 120 seconds, a fourth time interval is 240 seconds, and so on. The minimum time threshold can be minutes, hours, or days.

Though failed registration notifications are discussed herein as being received based on an error response (e.g., "Error Response (HTTP 4xx/5xx)"), such as that of an application server, the failed registration notifications can also be received, such as from a core access node, due to a request timeout or a connection time when the application server does not send any type of response. This can occur during complete network outages.

Embodiments of the invention can include a non-transitory computer readable medium which can store instructions for performing the above-described methods and any steps thereof, including any combinations of the same. For example, the non-transitory computer readable medium can store instructions for execution by one or more processors or similar devices.

Further embodiments of the present invention can also include the one or more user equipment(s), network sites, backend network, or servers which read out and execute computer executable instructions, such as a non-transitory computer-readable medium, recorded or stored on a storage medium (which may be the same as or different than the storage medium for storing images or files, as discussed above), to perform the functions of any embodiment. The user equipment or server may include one or more of a central processing unit (CPU), micro processing unit (MPU), or other circuitry, such as a processor, and may include a network of separate user equipment or servers or separate computer processors. The computer executable instructions may be provided to the user equipment, network node, or server, for example, from a network or the storage medium.

Though certain elements, aspects, components or the like are described in relation to one embodiment or example of a telecommunications network, those elements, aspects, components or the like can be including with any other telecommunications network, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A method for recovering access of an application of a user equipment (UE) to an application server, the method comprising:
   receiving a recovery request from the UE;
   setting a timer to measure a time interval based on a feature or characteristic of a failed authentication attempt of the application to the application server;
   in response to receiving the recovery request, generating a push request including an instruction to generate a push notification for transmission to the UE, the push notification having a payload that includes an instruction to:
   cause the application to switch from an inactive state to a temporary active state;
   while the application is in the temporary active state, cause the application to request registration of the UE with the application server;
   after the UE requests registration with the application server while the application is in the temporary active state, cause the application to return to the inactive state; and
   cause a user account of the application to log out if the time interval exceeds a time threshold; and
   outputting the push request to a push service.

2. The method of claim 1, wherein the push request is generated based on the feature or characteristic of the failed authentication attempt.

3. The method of claim 1, wherein the recovery request is received at a notification server, and the notification server outputs the push request to a push service upon expiration of the time interval.

4. The method of claim 1, further comprising generating multiple push requests, each push request to generate individual push notifications for transmission to the UE.

5. The method of claim 4, wherein each of the multiple push requests expire upon the UE registering with the application server or upon a second time interval between successive push requests exceeding a minimum time threshold.

6. The method of claim 5, wherein the multiple push requests are each timed apart by the second time interval.

7. The method of claim 6, wherein the second time interval between successive push notifications increases exponentially or multiplicatively.

8. The method of claim 1, further comprising receiving multiple recovery requests and generating the push request from each recovery request.

9. The method of claim 8, wherein each of the multiple recovery requests expire upon the UE registering with the application server or upon a second time interval between successive recovery requests exceeding a minimum time threshold.

10. The method of claim 9, wherein the multiple push requests are each timed apart by the second time interval.

11. The method of claim 10, wherein the second time interval between successive push notifications increases exponentially or multiplicatively.

12. The method of claim 1, wherein receiving the recovery request from the UE is in response to a network outage or a service disruption that disconnects the application of the UE from the application server.

13. The method of claim 1, wherein the recovery request includes the payload.

14. The method of claim 13, further comprising integrating the payload into the push request.

15. The method of claim 1, wherein the push request includes the payload.

\* \* \* \* \*